United States Patent
Agrawal et al.

(10) Patent No.: US 10,751,651 B2
(45) Date of Patent: Aug. 25, 2020

(54) NO FILTER NO RUN FLUID FILTRATION SYSTEM

(71) Applicant: Cummins Filtration IP, Inc., Columbus, IN (US)

(72) Inventors: Shubha Agrawal, Jaipur (IN); Hariprasad Mohan Bhalerao, Pune (IN); Amit Shashikant Wankhede, Pune (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 173 days.

(21) Appl. No.: 15/506,588

(22) PCT Filed: Sep. 1, 2015

(86) PCT No.: PCT/US2015/047923
§ 371 (c)(1),
(2) Date: Feb. 24, 2017

(87) PCT Pub. No.: WO2016/036730
PCT Pub. Date: Mar. 10, 2016

(65) Prior Publication Data
US 2018/0221797 A1   Aug. 9, 2018

Related U.S. Application Data

(60) Provisional application No. 62/044,653, filed on Sep. 2, 2014.

(51) Int. Cl.
| | | |
|---|---|---|
| *B01D 35/157* | (2006.01) | |
| *B01D 36/00* | (2006.01) | |
| *F16K 15/04* | (2006.01) | |
| *B01D 35/00* | (2006.01) | |
| *B01D 35/153* | (2006.01) | |
| *B01D 35/26* | (2006.01) | |

(52) U.S. Cl.
CPC ....... *B01D 35/1573* (2013.01); *B01D 35/005* (2013.01); *B01D 35/153* (2013.01); *B01D 35/1576* (2013.01); *B01D 35/26* (2013.01); *B01D 36/005* (2013.01); *F16K 15/04* (2013.01)

(58) Field of Classification Search
None
See application file for complete search history.

(56) References Cited

U.S. PATENT DOCUMENTS

| | | |
|---|---|---|
| 3,519,019 A | 7/1970 | Rieschel |
| 5,297,580 A | 3/1994 | Thurman |
| 5,643,446 A | 7/1997 | Clausen et al. |

(Continued)

OTHER PUBLICATIONS

International Search Report and Written Opinion issued for PCT/US2015/047923, dated Dec. 3, 2015, 9 Pages.

(Continued)

*Primary Examiner* — Benjamin M Kurtz
(74) *Attorney, Agent, or Firm* — Foley & Lardner LLP

(57) ABSTRACT

A filter system including a designated filter cartridge having a geometric projection, a flow restriction valve that controls fluid flow out of a filter system, and a priming pump configured to prime the filter. The flow restriction valve. The flow restriction valve includes at least on fluid flow check valve configured to allow the priming pump to prime the filter system.

20 Claims, 12 Drawing Sheets

(56) References Cited

U.S. PATENT DOCUMENTS

| | | |
|---|---|---|
| 6,053,334 A | 4/2000 | Popoff et al. |
| 6,328,883 B1 | 12/2001 | Jensen |
| 2004/0069700 A1 | 4/2004 | Miller et al. |
| 2005/0126649 A1 | 6/2005 | Onishi |
| 2009/0242816 A1 | 10/2009 | Husband et al. |
| 2011/0073538 A1* | 3/2011 | Jiang ............... B01D 29/21 210/234 |
| 2014/0027366 A1 | 1/2014 | Hawkins et al. |
| 2014/0216996 A1* | 8/2014 | Girondi ............ F02M 37/16 210/117 |

OTHER PUBLICATIONS

First Examination Report issued for Indian Patent Application No. 201747005987, dated Sep. 23, 2019, 8 pages.

\* cited by examiner

NO FILTER NO RUN FLUID FILTRATION SYSTEM

CROSS REFERENCE TO RELATED APPLICATIONS

This application is a National Stage of PCT Application No. PCT/US2015/047923, filed Sep. 1, 2015, which claims priority to and the benefit of U.S. Provisional Patent Application No. 62/044,653, filed Sep. 2, 2014. The contents of both applications are herein incorporated by reference in their entirety.

TECHNICAL FIELD

The present application relates to fluid filtration systems.

BACKGROUND

In many applications, it is desirable to have a fuel filtration system in which the flow of fuel to an engine is prevented if no filter cartridge is installed, or if an incorrect filter cartridge is installed. The operation of an engine with no filter cartridge installed or with an incorrect filter cartridge installed may result in a degradation of engine performance or permanent damage to the engine. Tampering with a no filter no run fluid filtration system may allow the operation of an engine with no filter cartridge installed or with an incorrect filter cartridge installed. Fluid filtration systems may also include a priming mechanism configured to move fluid through the fluid filtration system for the purposes of priming the fluid filtration system for operation.

As shown in FIG. 1, some conventional fluid filtration systems may include both a priming pump system and a flow restriction valve configured to prevent fluid flow through the fluid filtration system when no filter cartridge or an incorrect filter cartridge is installed in the system. In such conventional fluid filtration systems, the fluid filtration system may include a flow restriction valve body 10, a priming pump valve body 20, and a priming plunger assembly 30. The flow restriction valve body 10 and the priming pump valve body 20 are formed as separate components. The flow restriction valve body 10 of the pre-existing fluid filtration systems is susceptible to tampering, which may result in fluid flow through the fluid filtration system in the absence of a designated filter cartridge.

SUMMARY

Various embodiments relate to a fluid filtration system comprising a designated filter cartridge including a geometric projection therein and a filter cartridge housing including flow restriction valve. The geometric projection may engage the flow restriction valve when the designated filter cartridge is installed in the filter cartridge housing, allowing the flow of the fluid through the fluid filtration system. The flow restriction valve body includes at least one check valve configured to allow the operation of a priming pump of the fluid filtration system.

According to one embodiment, the filter system includes a filter cartridge including a geometric projection therein, a flow restriction valve that controls fluid flow out of the filter system and a priming pump configured to prime the filter. The flow restriction valve includes an opening keyed to the geometric projection such that the geometric projection engages the opening and actuates the flow restriction valve and the flow restriction valve includes at least one fluid flow check valve configured to allow the priming pump to prime the filter system. The flow restriction valve may include a ball and a fluid flow opening keyed to the ball such that, when a fluid pressure forces the ball against the fluid flow opening, fluid flow through the fluid flow opening is restricted. The flow restriction valve may further include a valve seal positioned between the valve ball and the fluid flow opening. The geometric projection may extend through the opening and prevents the ball from contacting the fluid flow opening, and the flow restriction valve is configured such that substantially no fluid flows through the flow restriction valve in the absence of the filter cartridge. The filter cartridge may be a designated filter cartridge specifically configured for use with the filter system The at least one fluid flow check valve may be an umbrella valve. Each umbrella valve may include a plurality of fluid flow openings. The flow restriction valve may include at least two fluid flow check valves, such as three fluid flow check valves. The fluid flow check valve may include a valve seat.

The priming pump may include a plunger. The priming pump may be incapable of priming the filter in the absence of the flow restriction valve. A sealing element may be disposed between the priming pump and the flow restriction valve The flow restriction valve may be connected to the filter system by a snap fit connection. The flow restriction valve may include a valve ball retention cage. The valve ball retention cage may be connected to the filter system by a snap fit connection. The flow restriction valve may include a flow outlet at a fluid flow check valve that is aligned with an inlet of the priming pump.

The filter system may include a filter housing. The filter housing may define a filter cartridge space in which the filter cartridge is disposed.

According to another embodiment, a flow restriction valve for a filter system includes a valve body and at least one fluid flow check valve. The valve body defines an opening keyed to a geometric projection of a filter cartridge, such that the geometric projection engages the opening and actuates the flow restriction valve. The at least one fluid flow check valve is configured to allow a priming pump to prime the filter system. The flow restriction valve may include a ball and a fluid flow opening keyed to the ball such that, when a fluid pressure forces the ball against the fluid flow opening, fluid flow through the fluid flow opening is restricted.

According to another embodiment, a filter system includes a filter cartridge including a geometric projection therein, a flow restriction valve that controls fluid flow out of the filter system, the flow restriction valve including an opening keyed to the geometric projection such that the geometric projection engages the opening and actuates the flow restriction valve, a priming pump configured to prime the filter, and a means for designating an appropriate filter cartridge. The flow restriction valve includes at least one fluid flow check valve configured to allow the priming pump to prime the filter system.

The means for designating the appropriate filter cartridge may prevent the installation of non-appropriate filter cartridges in the filter system. The priming pump may be incapable of priming the filter in the absence of the flow restriction valve. The system may include a filter housing, the filter housing defining a filter cartridge space in which the filter cartridge is disposed. The means for designating the appropriate filter cartridge may be disposed on the filter housing.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
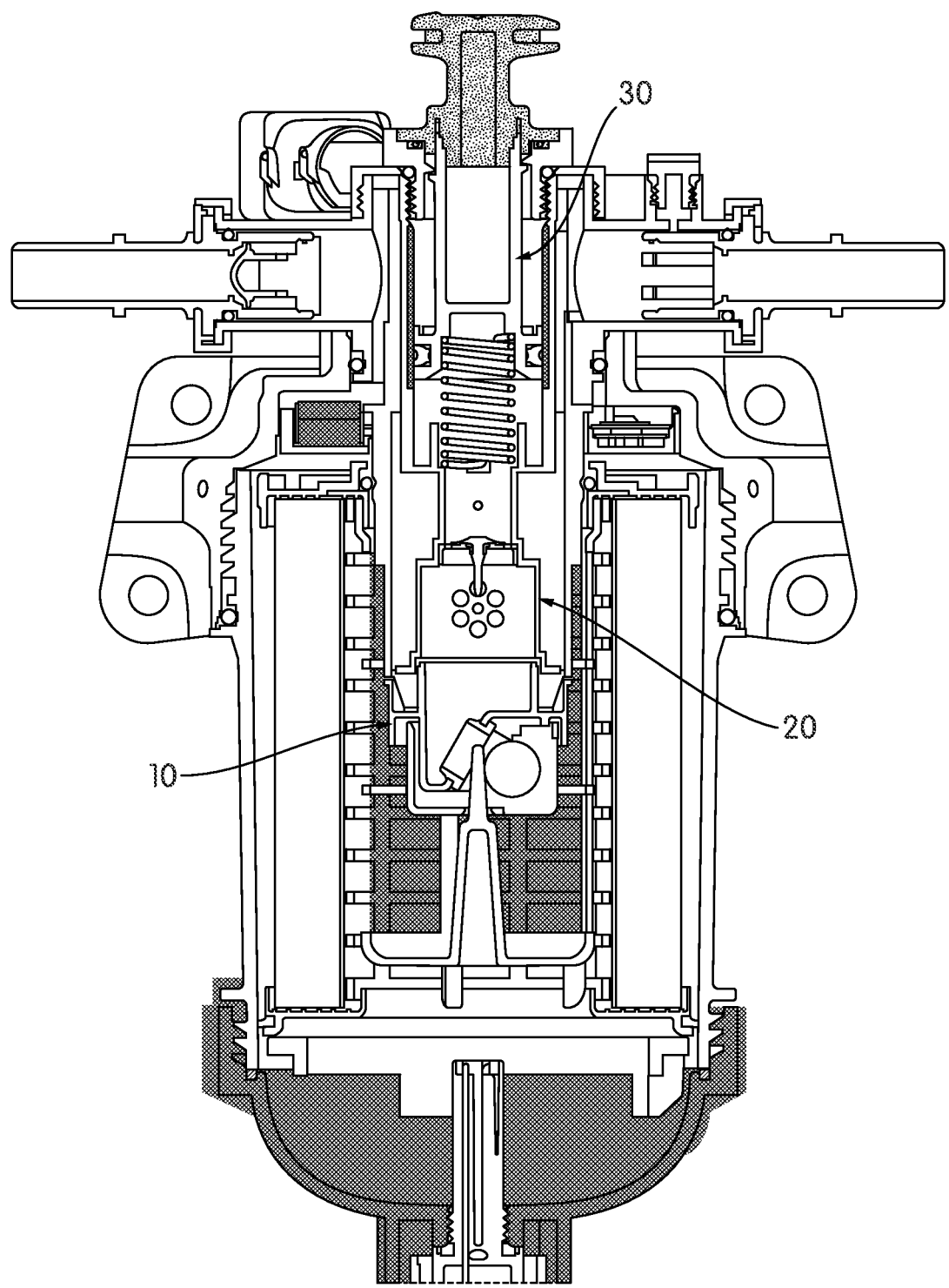
FIG. 1 is a cross-section view of a conventional fluid filtration system including a flow restriction valve and a priming pump.

Various exemplary embodiments relate to a fluid filtration system, for example a fuel filter system, that incorporates a filter cartridge and a filter cartridge housing a flow restriction valve for the purpose of preventing fluid flow through the system in the absence of a filter cartridge or where an incorrect filter cartridge is installed in the filter cartridge housing. The fluid filtration system also incorporates a priming pump system configured to prime the fluid filtration system. The fluid filtration system may be employed in any appropriate vehicle or engine application. According to one embodiment, the fluid filtration system may be employed in a diesel engine application.

According to an exemplary embodiment, the fluid filtration system is a "no filter, no run" system. A "no filter, no run" filter system is a system designed such that fluid flow through the system is prevented altogether or permitted in an amount insufficient to allow engine operation when no filter cartridge or an incorrect filter cartridge is installed in the system.

The priming pump system of the fluid filtration system may be configured to move the fluid to be filtered through the fluid filtration system. For example, the priming pump system may remove air that is trapped in the fluid filtration system by moving the fluid to be filtered through the fluid filtration system, such as after replacement of a filter cartridge. The priming pump system may be configured to operate when the fluid filtration system is not in normal operation. The priming pump system may include a plunger and a plurality of fluid flow check valves. The plunger may be operated by a user to create a flow of fluid through the priming pump system, and thereby through the fluid filtration system. As utilized herein, a fluid flow check valve allows fluid flow in only a single flow direction. The plurality of fluid flow check valves may be configured such that a first fluid flow check valve allows fluid flow in a first direction when the plunger is moved in a first direction, and a second fluid flow check valve allows fluid flow in a second direction when the plunger is moved in a second direction.

A fluid filtration system is provided that includes a 'no filter, no run' flow restriction valve body that incorporates at least one fluid flow check valve configured to allow the operation of a priming pump system. The combination of the flow restriction valve body and the fluid flow check valves of the priming pump system in a single component may prevent tampering with the flow restriction valve body. The inclusion of the fluid flow check valves in the flow restriction valve body may ensure that tampering with the flow restriction valve body will also impact the fluid flow check valves. For example, tampering with the flow restriction valve body by removing it from the fluid filtration system would also remove the fluid flow check valves, disabling the priming pump system. A disabled priming pump system may prevent the passage of fluid through the fluid filtration system by trapping air in the fluid filtration system. For example, a disabled priming pump system may trap air in the fuel filtration system and prevent fuel flow to an engine, thereby preventing operation of the engine.

Figure 2:
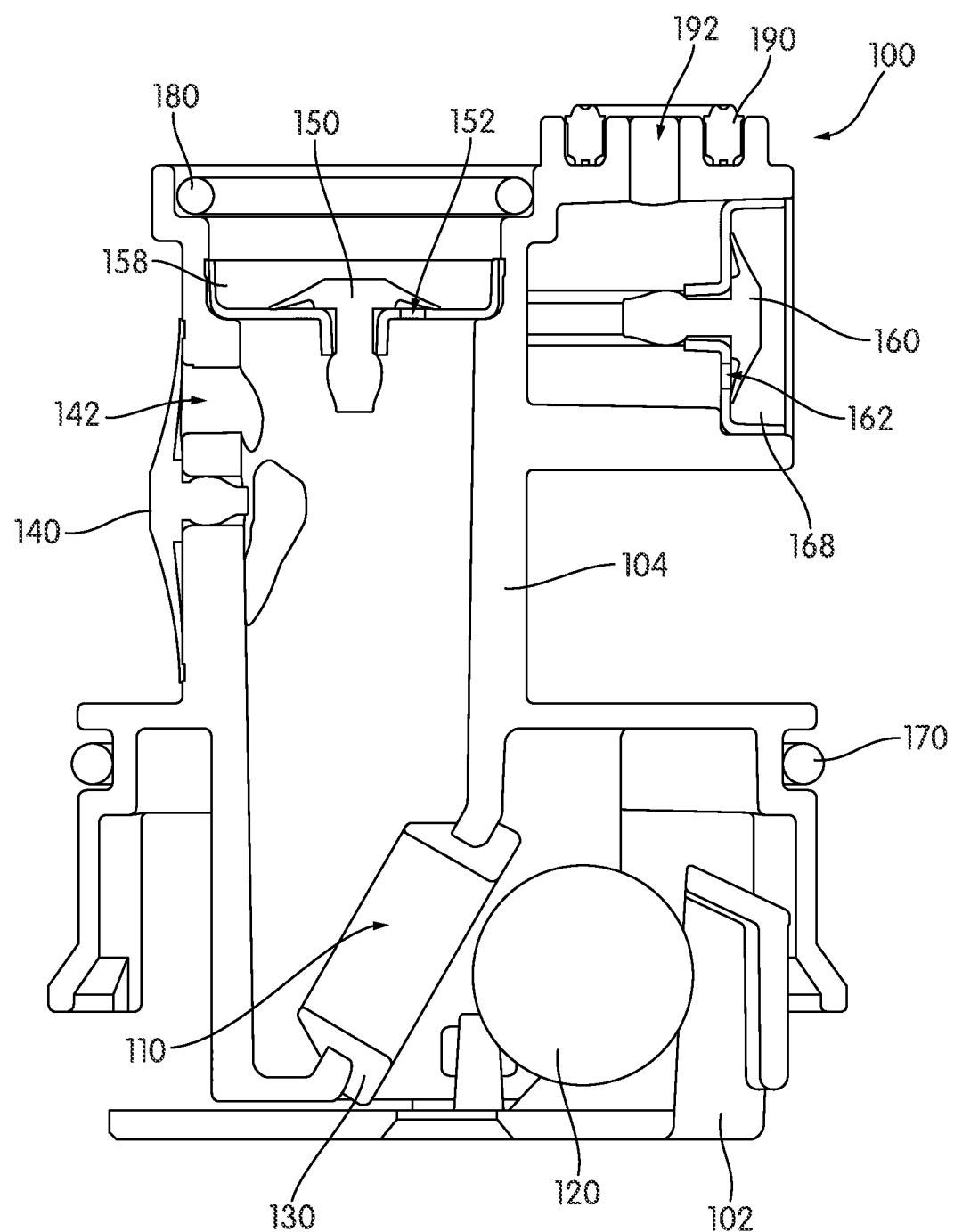
FIG. 2 is a cross-section view of a flow restriction valve body including three check valves configured to allow the operation of a priming pump.
Figure 3:
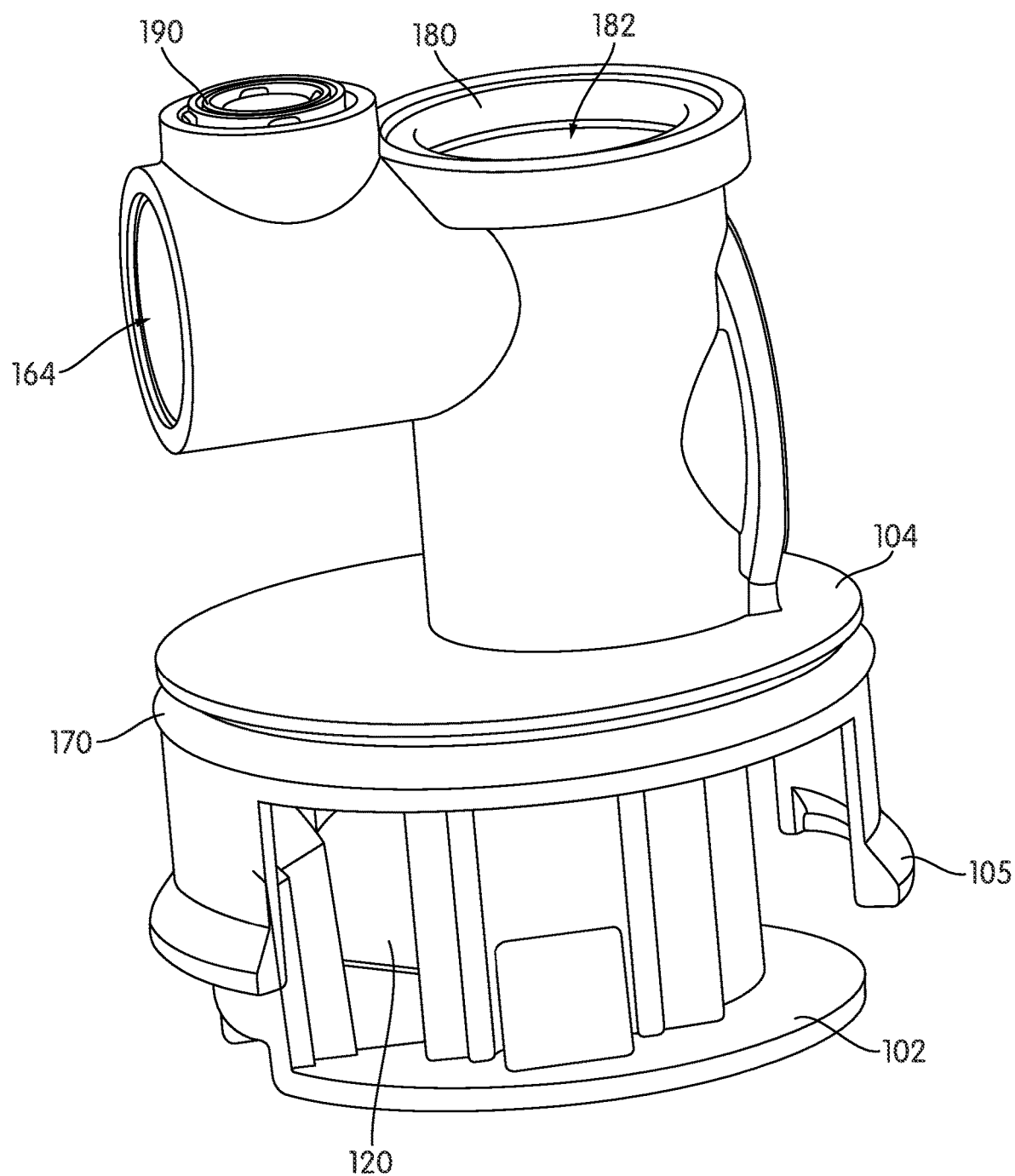
FIG. 3 is a perspective view of the flow restriction valve body of FIG. 2.

A flow restriction valve body 100 that includes a plurality of fluid flow check valves 140, 150, and 160 is depicted in FIGS. 2 and 3. The flow restriction valve body 100 may include a flow restriction valve 104, a flow restriction valve ball 120, and a flow restriction valve ball retention cage 102. The valve ball 120 may be of appropriate size to block fluid flow through a flow restriction valve fluid flow opening 110 by contacting a valve seat gasket 130. The valve ball 120 may be prevented from blocking the fluid flow opening 110 by a pin or projection of a designated filter cartridge installed in the fluid filtration system, allowing fluid to flow through the fluid flow opening 110.

The flow restriction valve body may additionally include fluid flow check valves. In particular implementations, the fluid check valves may be umbrella valves. The fluid flow restriction valve 104 of FIGS. 2 and 3 includes three umbrella valves 140, 150, and 160 in a particular implementation, each configured to allow fluid to flow out of the flow restriction valve body 100. In alternative implementations, it is possible to include only two such valves. Each of the umbrella valves 140, 150, and 160 are configured to cover umbrella valve fluid flow openings 142, 152, and 162, such that fluid may flow out of the flow restriction valve 104 through the fluid flow openings 142, 152, and 162 but not into the flow restriction valve 104. Umbrella valve seats 158 and 168 may be configured to fit within the flow restriction valve 104 and seal against the umbrella valves 150 and 160.

Figure 4:
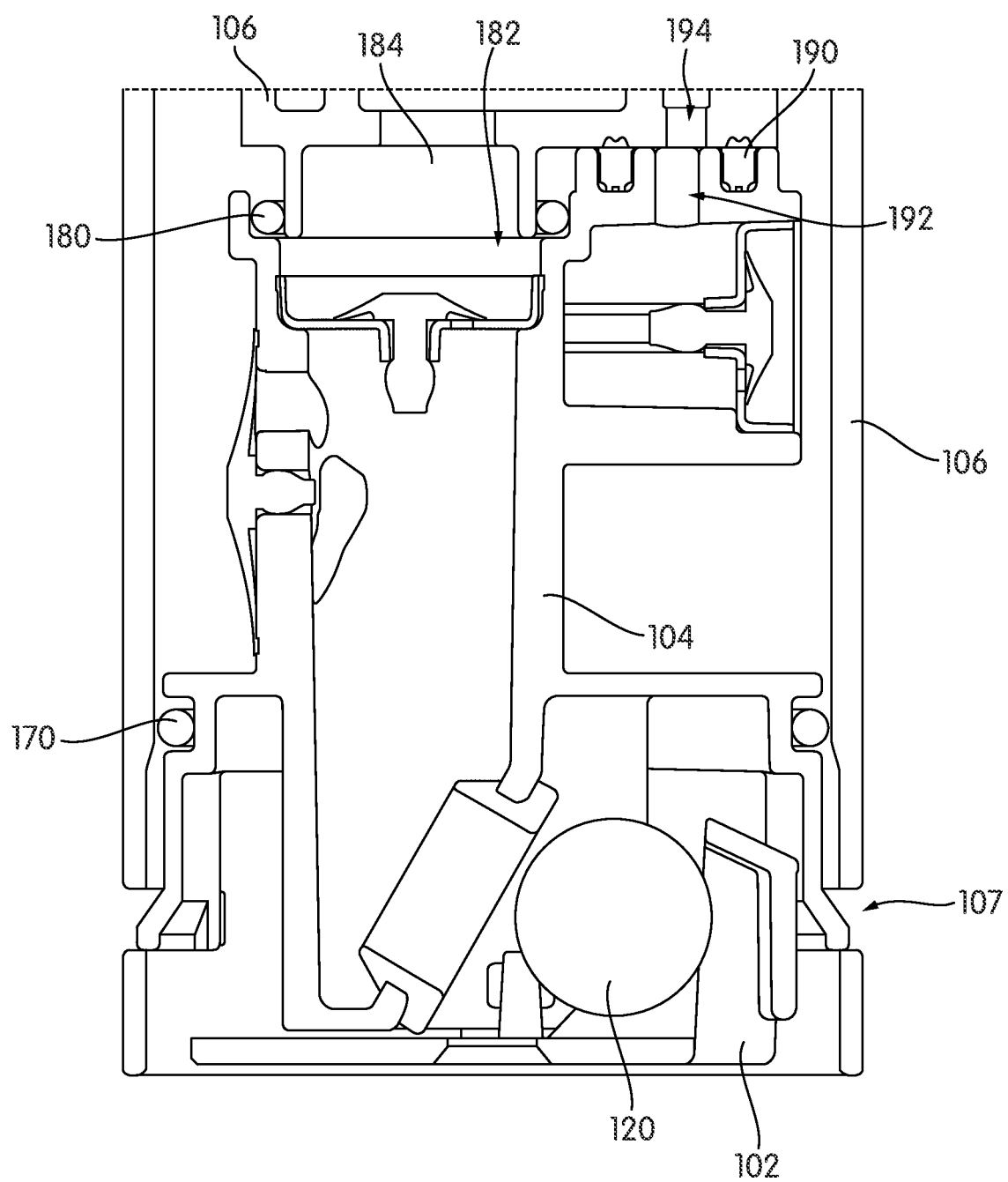
FIG. 4 is a cross-section view of the flow restriction valve body of FIG. 2 installed in a fluid filtration system.

The flow restriction valve 104 may include snap fit tabs 105. The snap fit tabs 105 may be configured to attach the flow restriction valve body 100 to a priming system body 106 by engaging the slots 107 in the priming system body, as shown in FIG. 4. The valve ball retention cage 102 may be attached to the flow restriction valve 104 by a snap fit connection. However, it is possible that, instead of a snap fit connection, other connection mechanisms such as screws and welding may be used in particular implementations.

A sealing element 170 may be present in a groove of the flow restriction valve 104. The sealing element 170 may be an o-ring, such as an elastomeric o-ring, configured to seal against the priming system body 106 when the flow restriction valve body is installed in the fluid filtration system. Additional sealing elements 180 and 190 may be configured to form a seal between the flow restriction valve 104 and the priming system body 106 when the flow restriction valve body is installed in the fluid filtration system. The sealing element 180 may be an o-ring, such as an elastomeric o-ring. The seals formed by the sealing elements 170, 180, and 190 may be fluid tight seals.

The flow restriction valve 104 may include a fluid flow outlet 182 at umbrella valve 150. The fluid flow outlet 182 may be configured to align with a fluid flow inlet 184 of the priming system body 106 when the fluid restriction valve 104 is installed in the fluid filtration system. The priming system body 106 may also include a fluid flow outlet 194 configured to align with a fluid flow inlet 192 of the flow restriction valve 104 when the flow restriction valve body 100 is installed in the fluid filtration system. The flow restriction valve 104 may include an additional fluid flow outlet 164 at umbrella valve 160.

Figure 5:
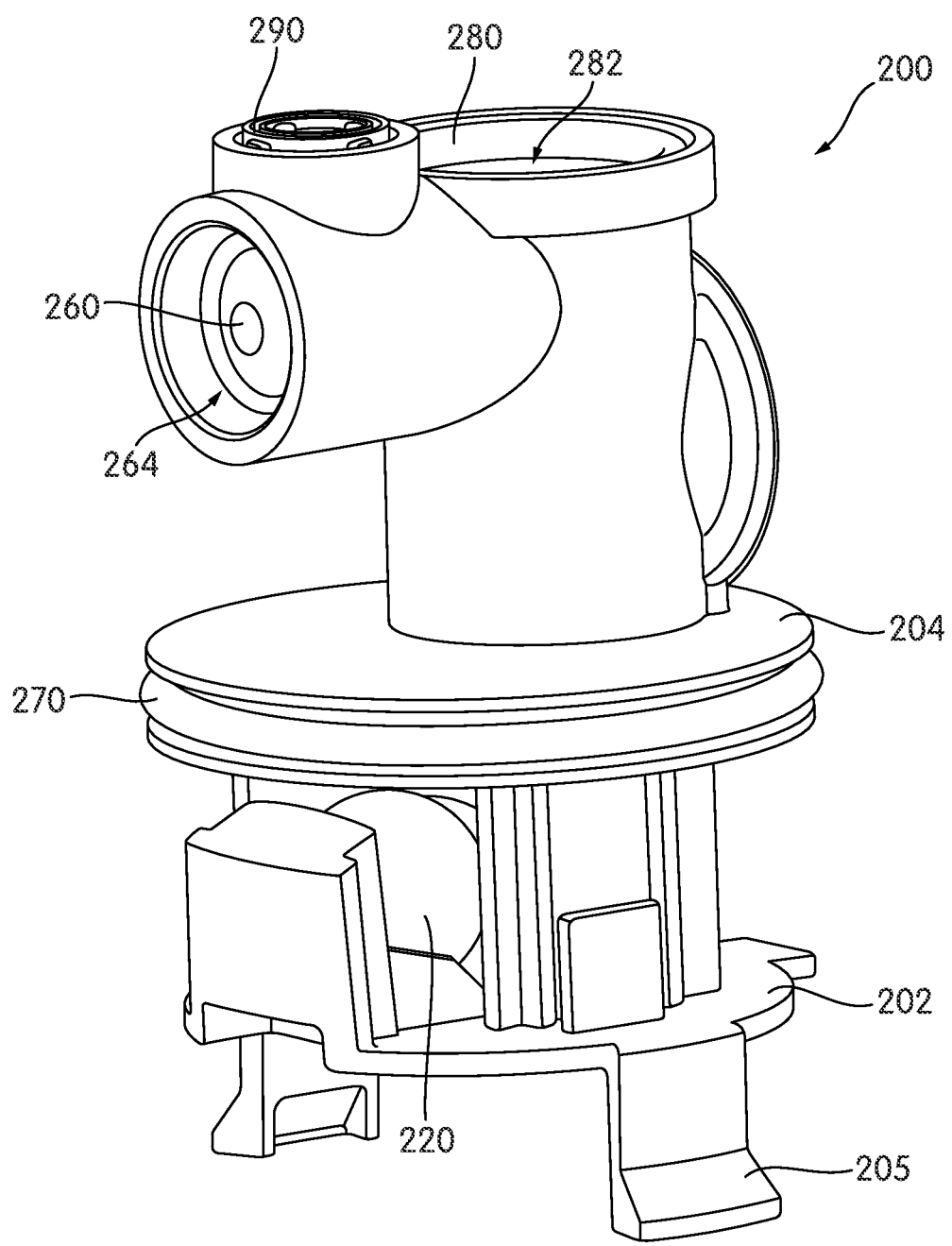
FIG. 5 is a perspective view of a flow restriction valve body.
Figure 6:
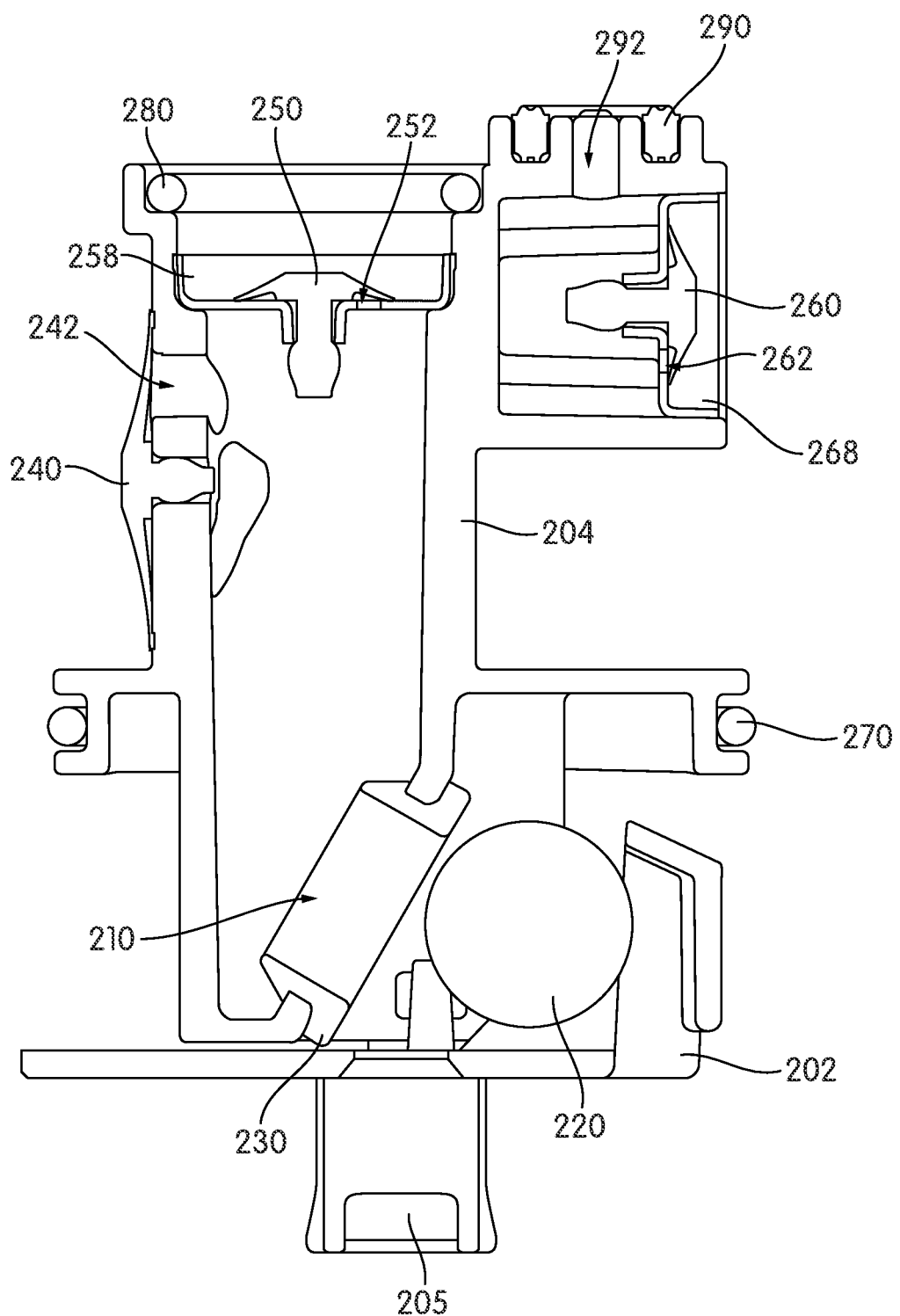
FIG. 6 is a cross-section view of the flow restriction valve body of FIG. 5 including three check valves configured to allow the operation of a priming pump.

An alternative flow restriction valve body 200 that includes a plurality of fluid flow check valves 240, 250, and 260 is depicted in FIGS. 5 and 6. The flow restriction valve body 200 may include a flow restriction valve 204, a flow restriction valve ball 220, and a flow restriction valve ball retention cage 202. The valve ball 220 may be of appropriate size to block fluid flow through a flow restriction valve fluid flow opening 210 by contacting a valve seat gasket 230. The valve ball 220 may be prevented from blocking the fluid flow opening 210 by a pin or projection of a designated filter cartridge installed in the fluid filtration system, allowing fluid to flow through the fluid flow opening 210.

Figure 7:
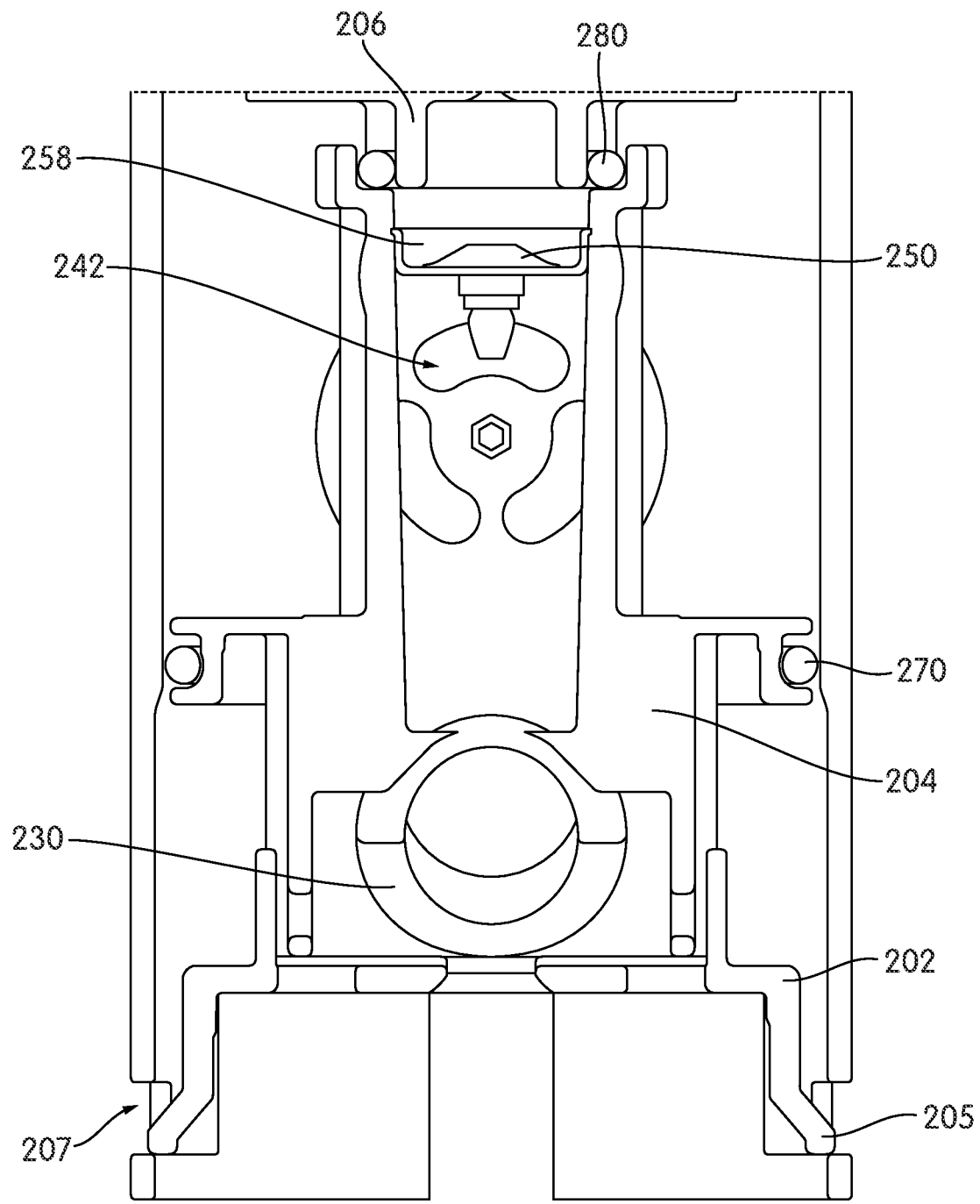
FIG. 7 is a cross-section view of the flow restriction valve body of FIG. 5.

The flow restriction valve body may additionally include fluid flow check valves. The fluid check valves may be umbrella valves. Fluid flow restriction valve 204 includes three umbrella valves 240, 250, and 260, each configured to allow fluid to flow out of the flow restriction valve body 2100. Each of the umbrella valves 240, 250, and 260 are configured to cover umbrella valve fluid flow openings 242, 252, and 262, such that fluid may flow out of the flow restriction valve 204 through the fluid flow openings 242, 252, and 262 but not into the flow restriction valve 204. As shown in FIG. 7, the umbrella valve 240 may be configured to cover the three fluid flow openings 242. Umbrella valve seats 258 and 268 may be configured to fit within the flow restriction valve 204 and seal against the umbrella valves 250 and 260.

The valve ball retention cage 202 may include snap fit tabs 205. The snap fit tabs 205 may be configured to attach the valve ball retention cage 202 to a priming system body 206 by engaging the slots 207 in the priming system body, as shown in FIG. 7. The valve ball retention cage 202 may be attached to the flow restriction valve 204 by a snap fit connection, thereby connecting the flow restriction valve body 200 to the priming system body 206. However, it is possible that, instead of a snap fit connection, other connection mechanisms such as screws and welding may be used in particular implementations.

A sealing element 270 may be present in a groove of the flow restriction valve 204. The sealing element 270 may be an o-ring, such as an elastomeric o-ring, configured to seal against the priming system body 206 when the flow restriction valve body is installed in the fluid filtration system. Additional sealing elements 280 and 290 may be configured to form a seal between the flow restriction valve 204 and the priming system body 206 when the flow restriction valve body is installed in the fluid filtration system. The sealing element 280 may be an o-ring, such as an elastomeric o-ring. The seals formed by the sealing elements 270, 280, and 290 may be fluid tight seals.

The flow restriction valve 204 may include a fluid flow outlet 282 at umbrella valve 250. The fluid flow outlet 282 may be configured to align with a fluid flow inlet 284 of the priming system body 206 when the fluid restriction valve 204 is installed in the fluid filtration system. The priming system body 206 may also include a fluid flow outlet configured to align with a fluid flow inlet 292 of the flow restriction valve 204 when the flow restriction valve body 200 is installed in the fluid filtration system. The flow restriction valve 204 may include an additional fluid flow outlet 264 at umbrella valve 260.

Figure 8:
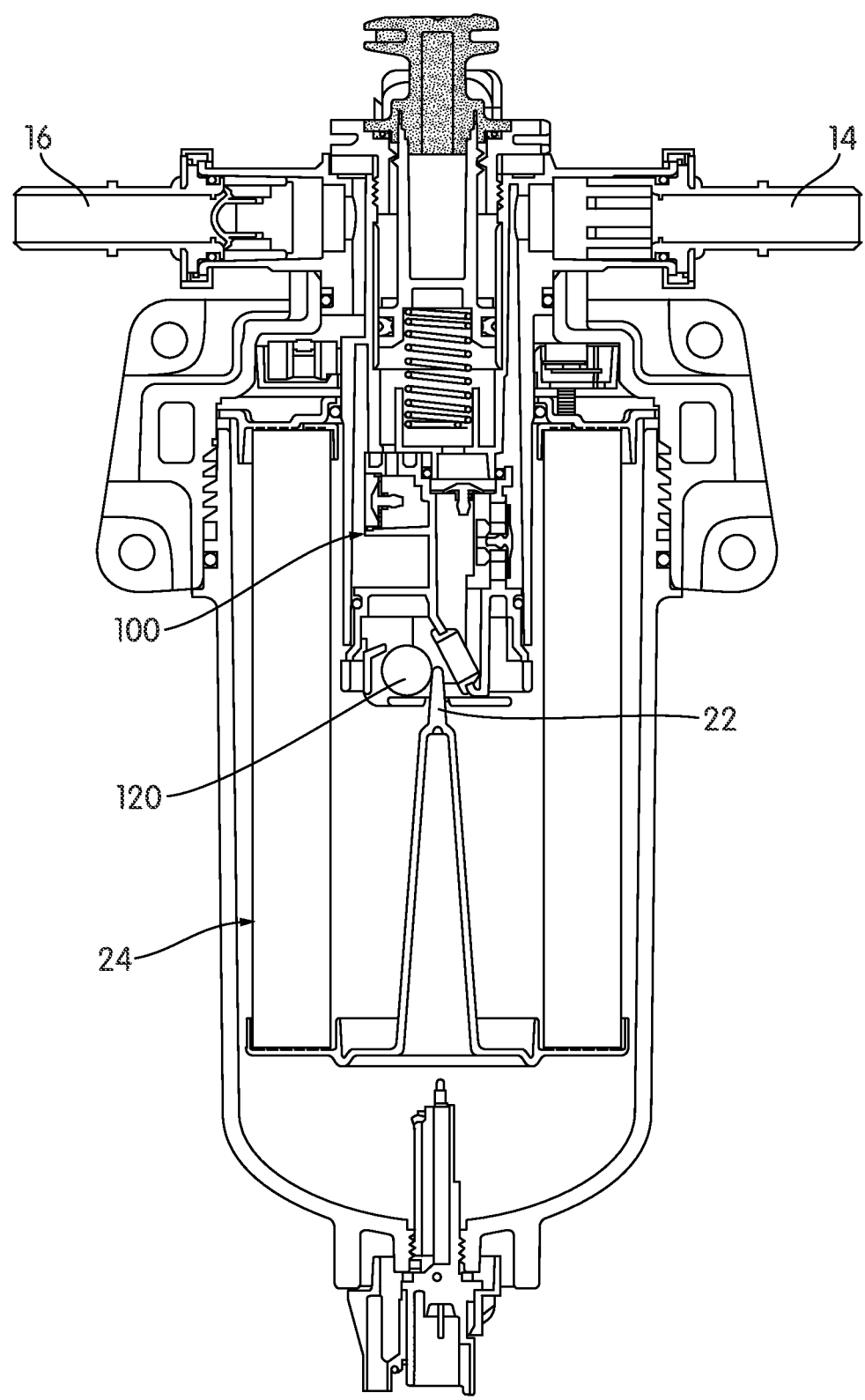
FIG. 8 is a cross-section view of a fluid filtration system including the flow restriction valve body of FIG. 2.

A cross section of a fluid filtration system including flow restriction valve body 100 is shown in FIG. 8. The fluid filtration system includes a fluid inlet 16 and a fluid outlet 14. A projection 22, such as a pin, of a correct filter cartridge 24 is configured to engage the valve ball 120 so that the flow restriction valve is in an open configuration and allows fluid flow therethrough.

Figure 9:
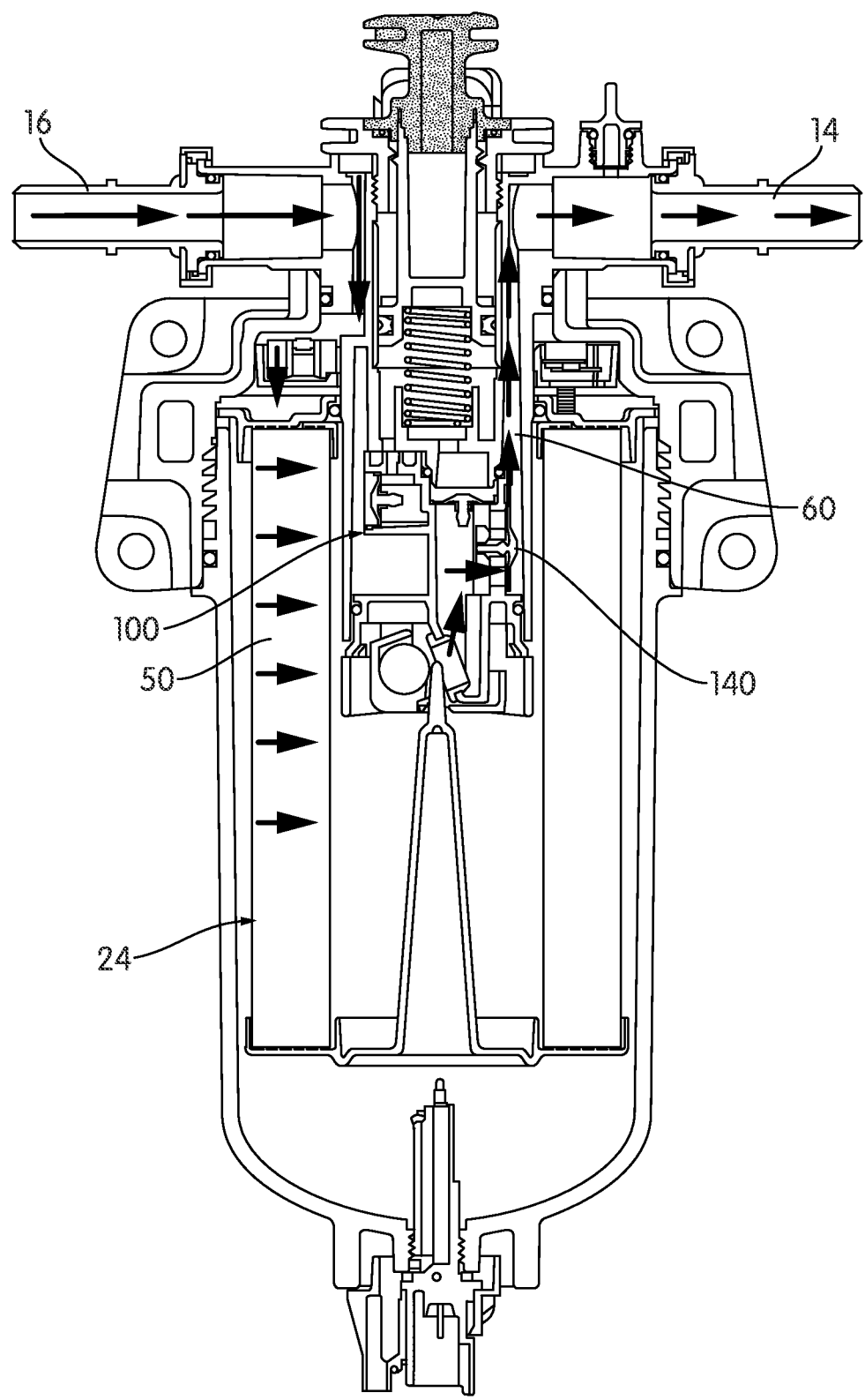
FIG. 9 is a cross-section view of the fluid filtration system of FIG. 8, including a fluid flow path when the fluid filtration system is in normal operation.

The fluid flow path of the fluid in the fluid filtration system of FIG. 8 in normal operation is depicted in FIG. 9. The unfiltered fluid 50 enters the fluid filtration system through inlet 16 and passes through the filter cartridge 24. The filtered fluid 60 then passes through the umbrella valve 140 of the flow restriction valve 100, and out of the fluid filtration system via the outlet 14.

Figure 10:
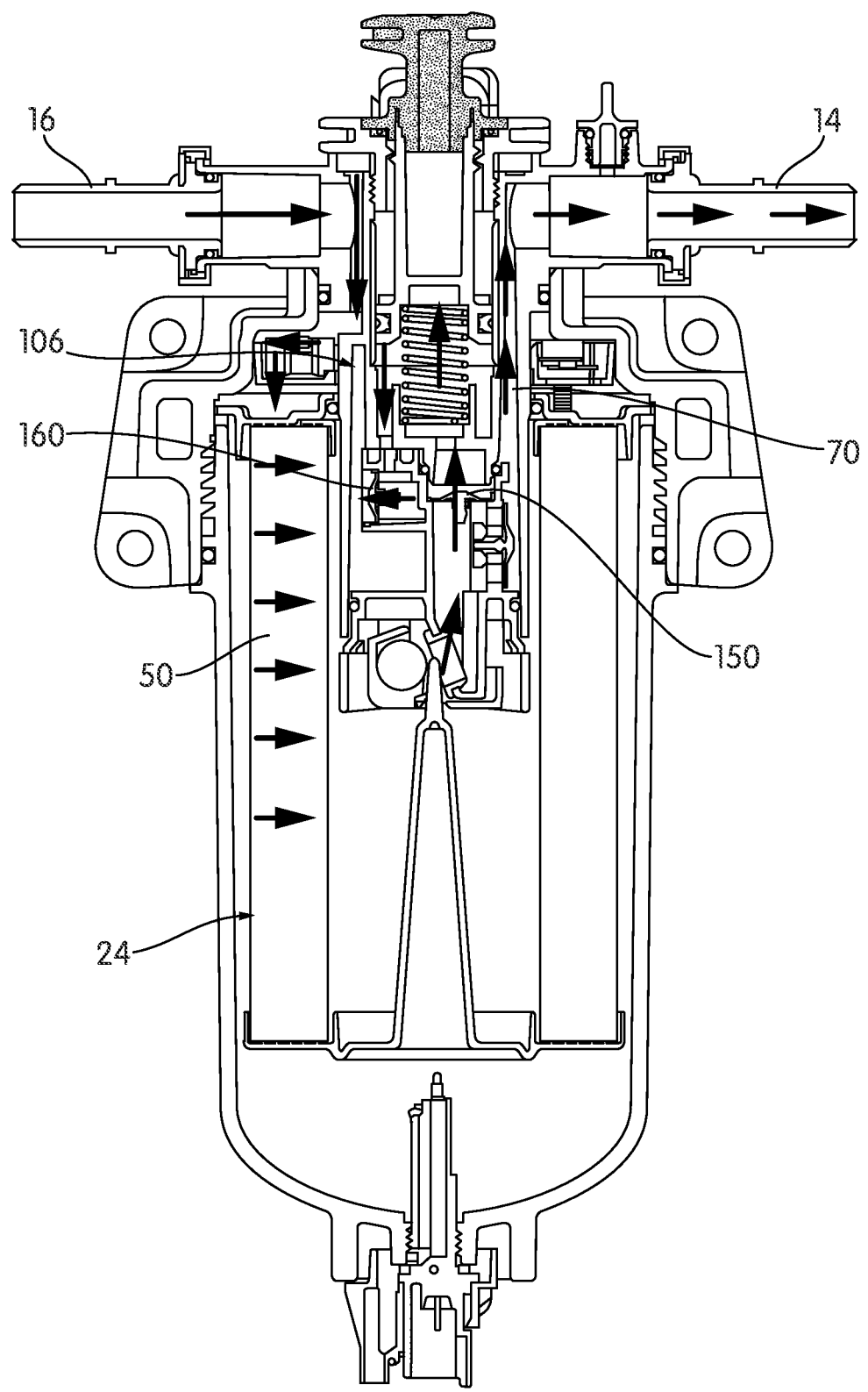
FIG. 10 is a cross-section view of the fluid filtration system of FIG. 8, including a fluid flow path when the priming pump is in operation.

The fluid flow path of the fluid in the fluid filtration system of FIG. 8 in priming operation is depicted in FIG. 10. The unfiltered fluid 50 enters the fluid filtration system through inlet 16 and passes through the filter cartridge 24. The filtered fluid 70 then passes through the umbrella valve 150 of the flow restriction valve 100 to the priming system body 106, and out of the priming system body 106 into the flow restriction valve 100. The filtered fluid 70 then passes through the umbrella valve 160 and out of the fluid filtration system via the outlet 14. The filtered fluid may flow through the umbrella valve 150 when a priming plunger is moved away from the fluid filtration system, and flow through the umbrella valve 160 when a priming plunger is moved towards the fluid filtration system.

Figure 11:
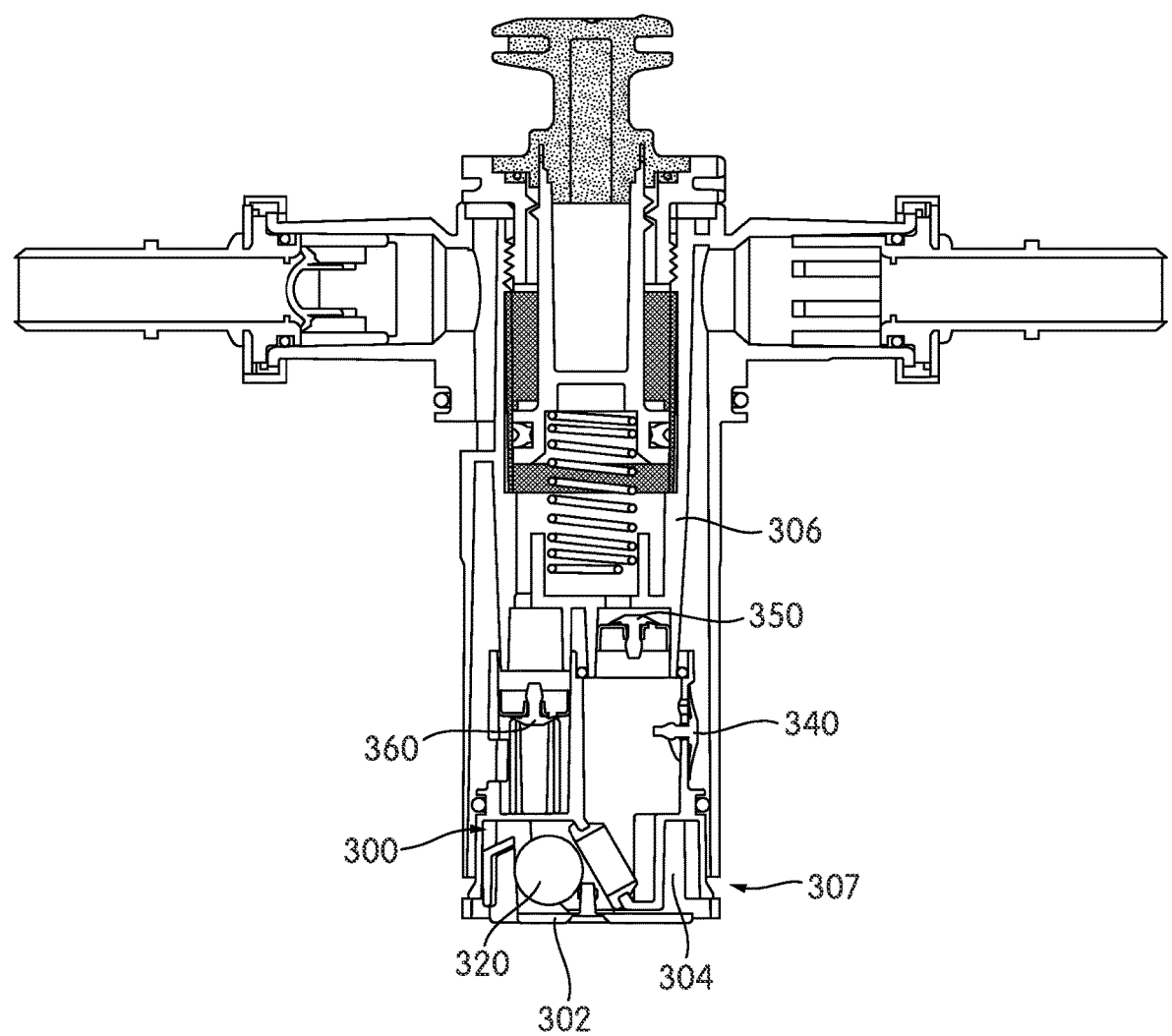
FIG. 11 is a cross-section view of a flow restriction valve body installed in a fluid filtration system priming pump.
Figure 12:
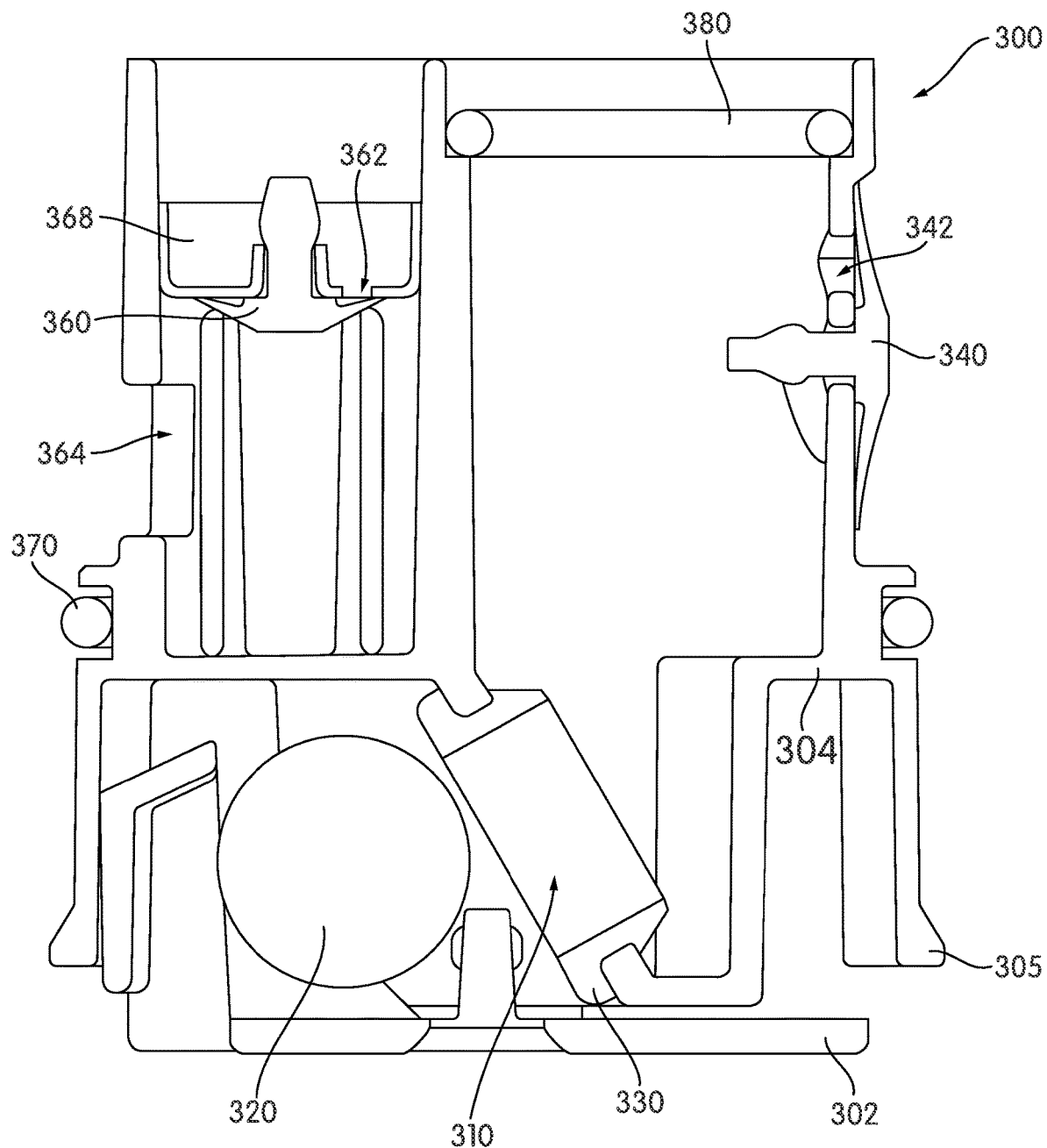
FIG. 12 is a cross-section view of the flow restriction valve body of FIG. 11.

An alternative flow restriction valve body 300 is depicted in FIGS. 11 and 12. The flow restriction valve body 300 may include a flow restriction valve 304, a flow restriction valve ball 320, and a flow restriction valve ball retention cage 302. The valve ball 320 may be of appropriate size to block fluid flow through a flow restriction valve fluid flow opening 310 by contacting a valve seat gasket 330. The valve ball 320 may be prevented from blocking the fluid flow opening 310 by a pin or projection of a designated filter cartridge installed in the fluid filtration system, allowing fluid to flow through the fluid flow opening 310.

The flow restriction valve body may additionally include fluid flow check valves. The fluid check valves may be umbrella valves. Fluid flow restriction valve 304 includes two umbrella valves 340 and 360, each configured to allow fluid to flow out of the flow restriction valve body 300. Each of the umbrella valves 340 and 360 are configured to cover umbrella valve fluid flow openings 342 and 362, such that fluid may flow out of the flow restriction valve 304 through the fluid flow openings 342 and 362 but not into the flow restriction valve 304. An umbrella valve seat 368 may be configured to fit within the flow restriction valve 304 and seal against the umbrella valve 360.

The flow restriction valve 304 may include snap fit tabs 305. The snap fit tabs 305 may be configured to attach the flow restriction valve body 300 to a priming system body 306 by engaging slots 307 in the priming system body 306, as shown in FIG. 11. The valve ball retention cage 302 may be attached to the flow restriction valve 304 by a snap fit connection. However, it is possible that, instead of a snap fit connection, other connection mechanisms such as screws and welding may be used in particular implementations.

A sealing element 370 may be present in a groove of the flow restriction valve 304. The sealing element 370 may be an o-ring, such as an elastomeric o-ring, configured to seal against the priming system body 306 when the flow restriction valve body is installed in the fluid filtration system. Additional sealing element 380 may be configured to form a seal between the flow restriction valve 304 and the priming system body 306 when the flow restriction valve body is installed in the fluid filtration system. The sealing element 380 may be an o-ring, such as an elastomeric o-ring. The seals formed by the sealing elements 370 and 380 may be fluid tight seals.

The flow restriction valve 304 may include a fluid flow outlet configured to supply fluid to an umbrella valve 350 that is part of the priming system body 306. The priming system body 106 may also include a fluid flow outlet configured to align with the umbrella valve 360 of the flow restriction valve 304 when the flow restriction valve body 300 is installed in the fluid filtration system. The flow restriction valve 304 may include an additional fluid flow outlet 364 to allow the fluid that passes through the umbrella valve 360 to flow out of the flow restriction valve body 300.

The priming system body may include a fluid flow check valve. The fluid flow check valve may be an umbrella valve 350. The umbrella valve 350 may be configured to receive fluid from the flow restriction valve 304.

The filter cartridge may be a designated filter cartridge, wherein a designated filter cartridge is a filter cartridge specifically designed for use in the filter system. The specifically selected characteristics of a designated filter cartridge designed for use in the filter system may be any appropriate characteristics, such as the size, shape, porosity, and flow characteristics of the filter cartridge.

The filter system may include a means for designating an appropriate filter cartridge for use in the filter system. The means for designating an appropriate filter cartridge may include a specifically designed filter cartridge space in the filter system is provided that allows the installation of only filter cartridges with the appropriate size and shape. Alternatively, the means for designating an appropriate filter cartridge may include a geometric projection of the filter system that is configured to engage a corresponding recess on the appropriate filter cartridge. The means for designating an appropriate filter cartridge may also include the opposite situation, in which a recess is provided in the filter system that is configured to engage a corresponding geometric projection of the appropriate filter cartridge. The means for designating an appropriate filter cartridge may be disposed on a filter housing of the filter system.

The flow restriction valve bodies including at least one fluid flow check valve may discourage tampering with the flow restriction valve body of a fluid filtration system. Additionally, the flow restriction valve bodies described herein may be easier to assemble and produce than pre-existing flow restriction valve bodies and priming system valve bodies. For example, fluid filtration systems containing the flow restriction valve bodies described herein may have fewer parts than pre-existing fluid filtration systems that include distinct flow restriction valve bodies and priming system valve bodies.

According to an exemplary embodiment, the fluid filtration system is a fuel filter system. In a more particular embodiment, the filter system is a diesel fuel filter system that removes contaminants from the fuel before the fuel reaches a protected system. In one embodiment the contaminant may include water. The protected system may be a fuel injection pump and fuel injectors. In another embodiment, the fluid filtration system may be applied to filter any suitable fluid including lubricants, hydraulic oil and air.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter system comprising:
a filter cartridge including a geometric projection therein and defining an interior volume;
a flow restriction valve body housed within the interior volume of the filter cartridge and comprising a flow restriction valve, a first fluid flow check valve, a second fluid flow check valve, a fluid flow inlet, and a fluid flow outlet positioned at the second fluid flow check valve, wherein the first fluid flow check valve and the second fluid flow check valve are formed as part of the flow restriction valve body, the flow restriction valve controls fluid flow out of the filter system and includes an opening keyed to the geometric projection such that the geometric projection engages the opening and actuates the flow restriction valve; and
a priming system body coupled to the flow restriction valve body and comprising a priming pump configured to prime the filter system, a priming system inlet in fluid communication with the fluid flow outlet of the flow restriction valve body, and a priming system outlet;
wherein during normal operation, the first fluid flow check valve is configured to allow fluid to flow out of the flow restriction valve bypassing the priming system body, and during priming operation, the priming pump is configured to prime the filter system by allowing fluid to flow out of the flow restriction valve into the priming system body but not into the flow restriction valve through the second fluid flow check valve, the priming pump incapable of priming the filter system in the absence of the flow restriction valve body.

2. The system of claim 1, wherein the flow restriction valve comprises a ball and a fluid flow opening keyed to the ball such that, when a fluid pressure forces the ball against the fluid flow opening, fluid flow through the fluid flow opening is restricted.

3. The system of claim 2, wherein the flow restriction valve comprises a valve seal positioned between the valve ball and the fluid flow opening.

4. The system of claim 2, wherein the geometric projection extends through the opening and prevents the ball from contacting the fluid flow opening.

5. The system of claim 2, wherein the flow restriction valve is configured such that substantially no fluid flows through the flow restriction valve in the absence of the filter cartridge.

6. The system of claim 1, wherein the first fluid flow check valve is an umbrella valve.

7. The system of claim 6, wherein the umbrella valve includes a plurality of fluid flow openings.

8. The system of claim 1, wherein the priming pump comprises a plunger.

9. The system of claim 1, wherein the flow restriction valve body comprises the first fluid flow check valve, the second fluid flow check valve, and at least one additional fluid flow check valve.

10. The system of claim 1, wherein the flow restriction valve body is connected to the filter system by a snap fit connection.

11. The system of claim 1, wherein the flow restriction valve further comprises a valve ball retention cage.

12. The system of claim 11, wherein the valve ball retention cage is connected to the filter system by a snap fit connection.

13. The system of claim 1, wherein the fluid flow outlet is aligned with the priming system inlet.

14. The system of claim 1, further comprising a sealing element disposed between the priming pump and the flow restriction valve body.

15. The system of claim 1, wherein the first fluid flow check valve and the second fluid flow check valve each comprise a valve seat.

16. The system of claim 1, further comprising a filter housing, the filter housing defining a filter cartridge space in which the filter cartridge is disposed.

17. The system of claim 1, wherein the filter cartridge is a designated filter cartridge specifically configured for use with the filter system.

18. A filter system comprising:
a filter cartridge defining an interior volume;
a flow restriction valve body housed within the interior volume of the filter cartridge and comprising a flow restriction valve, a first fluid flow check valve, a second fluid flow check valve, a fluid flow inlet, and a fluid flow outlet positioned at the second fluid flow check valve, wherein the first fluid flow check valve and the second fluid flow check valve are formed as part of the flow restriction valve body, the flow restriction valve controls fluid flow out of the filter system;
a priming system body comprising a priming pump configured to prime the filter system, a priming system inlet in fluid communication with the fluid flow outlet of the flow restriction valve body, and a priming system outlet; and
a means for designating an appropriate filter cartridge;
wherein during normal operation, the first fluid flow check valve is configured to allow fluid to flow out of the flow restriction valve bypassing the priming system body, and during priming operation, the priming pump is configured to prime the filter system by allowing fluid to flow out of the flow restriction valve into the priming system body but not into the flow restriction valve through the second fluid flow check valve, the priming pump incapable of priming the filter system in the absence of the flow restriction valve body.

19. The system of claim 18, wherein the means for designating the appropriate filter cartridge prevents the installation of non-appropriate filter cartridges in the filter system.

20. The system of claim 18, further comprising a filter housing, the filter housing defining a filter cartridge space in which the filter cartridge is disposed.

* * * * *